(12) United States Patent
Lee et al.

(10) Patent No.: US 11,120,249 B2
(45) Date of Patent: Sep. 14, 2021

(54) METHOD FOR DETERMINING CELLULAR NUCLEAR-TO-CYTOPLASMIC RATIO

(71) Applicant: National Cheng Kung University, Tainai (TW)

(72) Inventors: Gwo Giun Lee, Tainan (TW); Yi-Hsuan Chou, Taichung (TW); Chen-Han Sung, Tainan (TW)

(73) Assignee: National Cheng Kung University, Tainan (TW)

( * ) Notice: Subject to any disclaimer, the term of this patent is extended or adjusted under 35 U.S.C. 154(b) by 1 day.

(21) Appl. No.: 16/724,292

(22) Filed: Dec. 22, 2019

(65) Prior Publication Data

US 2021/0182528 A1 Jun. 17, 2021

(51) Int. Cl.
*G06K 9/00* (2006.01)
*G06T 7/11* (2017.01)
(Continued)

(52) U.S. Cl.
CPC ............ *G06K 9/0014* (2013.01); *G06T 5/002* (2013.01); *G06T 5/009* (2013.01); *G06T 5/20* (2013.01); *G06T 5/40* (2013.01); *G06T 7/0012* (2013.01); *G06T 7/11* (2017.01); *G06T 7/13* (2017.01); *G06T 7/149* (2017.01); *G06T 7/60* (2013.01); *G06T 7/70* (2017.01); *G06T 2207/10056* (2013.01); *G06T 2207/20061* (2013.01); *G06T 2207/20116* (2013.01); *G06T 2207/20152* (2013.01); *G06T 2207/30004* (2013.01); *G06T 2207/30204* (2013.01)

(58) Field of Classification Search
CPC ........... G06K 9/0014; G06T 7/11; G06T 7/13; G06T 7/149; G06T 7/70; G06T 5/002; G06T 5/009; G06T 5/20; G06T 5/40; G06T 7/0012; G06T 7/60
See application file for complete search history.

(56) References Cited

U.S. PATENT DOCUMENTS 9,122,907 B2 * 9/2015 Lee ................. G06T 7/0012
2012/0243797 A1 * 9/2012 Di Venuto Dayer ................
G06K 9/3208
382/218

(Continued)

OTHER PUBLICATIONS

Lin Yang, P. Meer and D. J. Foran, "Unsupervised segmentation based on robust estimation and color active contour models," in IEEE Transactions on Information Technology in Biomedicine, vol. 9, No. 3, pp. 475-486, Sep. 2005, doi: 10.1109/TITB.2005.847515. (Year: 2005).*

(Continued)

*Primary Examiner* — Utpal D Shah
(74) *Attorney, Agent, or Firm* — Grace Lee Huang

(57) ABSTRACT

The present disclosure is to provide a computer-aided cell segmentation method for determining cellular Nuclear-to-Cytoplasmic ratio, which comprises acts of obtaining a cytological image using non-invasive in vivo biopsy technique; performing a nuclei segmentation process to identify a position and a contour of each of identified nuclei in the cytological image; performing a cytoplasmic process with an improved active contour model to obtain a cytoplasmic region for each identified nucleus based; and determine a cellular Nuclear-to-Cytoplasmic ratio based on the obtained nucleus and cytoplasmic regions.

12 Claims, 11 Drawing Sheets

(51) Int. Cl.
  *G06T 5/40* (2006.01)
  *G06T 7/13* (2017.01)
  *G06T 7/149* (2017.01)
  *G06T 7/70* (2017.01)
  *G06T 5/00* (2006.01)
  *G06T 5/20* (2006.01)
  *G06T 7/00* (2017.01)
  *G06T 7/60* (2017.01)

(56) References Cited

U.S. PATENT DOCUMENTS

2015/0031051 A1* 1/2015 Mohan ............... G02B 21/0076
  435/7.24
2015/0078648 A1* 3/2015 Lee ..................... G06K 9/0014
  382/133
2017/0309017 A1* 10/2017 Cheng .................... G06K 9/40

OTHER PUBLICATIONS

Gwo Giun (Chris) Lee, Shi-Yu Hung, Tai-Ping Wang, Chun-Fu (Richard) Chen, Chi-Kuang Sun, Yi-Hua Liao, "Efficient Nuclei Segmentation based on Spectral Graph Partitioning," 2016 IEEE International Symposium on Circuits and Systems (ISCAS), Montréal, QC, pp. 2723-2726, May 2016.

Yi-Hsuan Chou, Gwo Giun (Chris) Lee, Yi-Hua Liao, Chi-Kuang Sun, "Unsupervised Cell Segmentation Using Statistical Active Contour Model," 2014 Global Biotechnology Congress (GBC).

* cited by examiner

METHOD FOR DETERMINING CELLULAR NUCLEAR-TO-CYTOPLASMIC RATIO

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

FIELD OF THE INVENTION

The present invention relates to a cell image segmentation method to identify the regions of nuclei and cytoplasmic in the cytological image, and more particularly to a method for determining cellular Nuclear-to-Cytoplasmic (NC) ratio.

BACKGROUND OF THE INVENTION

Recently, an optical noninvasive in vivo virtual biopsy technique based on Third Harmonic Generation (THG) has been successfully applied to cytological analyses in skin cancer due to its ability to clearly define both the boundary of nuclei and cytoplasm in the epidermis. The NC ratios of epidermis in subject with skin cancer are commonly larger compared to normal cells. Hence, NC ratio in epidermis is a promising indicator to recognize early skin cancer, including different types and stages of the developing disease. Nonetheless, traditional NC ratio calculation and analysis is performed manually by trained personnel. Manually delineation on a large amount of THG images is time-consuming and has unexpected human errors, and thus there is a need of using computer-aided cell segmentations.

There are many segmentation methods can be deployed on computers for processing biomedical and cytological images, such as image thresholding, region growing, watershed transform, convergence index filter, clustering and active contour model. Image thresholding is the assumption that the contrast of interested region and background is differentiable. Region growing is one of region-based approaches that probe spatial relation between initial seed and adjacent pixels to group them together into larger regions. Watershed transform is another famous region-based image segmentation technique which considers contextual information in images. Based on the idea of the flooding phenomenon occurring on topographic surface, the watershed transformation uses the concept of morphological image processing to mimic that phenomenon and segment the desired objects. Convergence index filter is designed for the enhancement of object boundary with weak contrast and irregular noise in images. Clustering such as k-means is to divide the input data into several groups according to their similarities; however, the decision of cluster number is critical and should be considered carefully. Active contour model, also known as snake, identifies the boundaries of objects by gradual movement of the contours under the influence of internal and external force through an optimization process to find desired features. However, none of above-mentioned method is perfect.

Accordingly, it is a challenge to provide automatically computer-aided cell segmentation and NC ratio evaluation for many fields among biomedical and cytological images for generating high efficiency, consistent accuracy and objective image segmentation results.

SUMMARY

According to an aspect of the present disclosure is to provide a computer-aided cell segmentation method for determining cellular Nuclear-to-Cytoplasmic ratio.

In an embodiment of the present disclosure, the method for determining cellular Nuclear-to-Cytoplasmic ratio comprises acts of obtaining a cytological image using noninvasive in vivo biopsy technique; performing a nuclei segmentation process to identify a position and a contour of each of identified nuclei in the cytological image; performing a cytoplasmic process with an improved active contour model to obtain a cytoplasmic region for each identified nucleus based; and determine a cellular Nuclear-to-Cytoplasmic ratio based on the obtained nucleus and cytoplasmic regions.

The improved active contour model also called as a statistical pressure snake based on the balloon snake is configured for joining the contextual and locality information of image data into energy minimization process to make the snake more converge to the cytoplasm outer boundary with the initial contour on nuclei border. The proposed statistical pressure snake considering the contextual information in image domain not only adapts to different cell structure during each process of cytoplasmic boundary detection, but also becomes an optimal parameter setting snake.

Accordingly, the present invention is able to provide a method for automatically computer-aided cell segmentation and NC ratio evaluation for many fields among biomedical and cytological images for generating high efficiency, consistent accuracy and objective image segmentation results.

BRIEF DESCRIPTION OF THE DRAWINGS

The present invention is illustrated by way of example, and not by way of limitation, in the figures of the accompanying drawings in which like reference numerals refer to the same or similar elements and in which.

DETAILED DESCRIPTION

In the following description, methods, apparatus, and systems for cell image segmentation method to identify the regions of nuclei and cytoplasmic in the cytological image are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the embodiments may be executed in one or more general purpose or specialized computing devices including server computers, personal computers, laptop computers, mobile computing devices such as smartphones' and 'tablet computer', one or more general purpose or specialized processors and electronic circuitries.

The embodiments include user interfaces and computer storage media having computer instructions or software codes stored therein which can be used to program computers or microprocessors to perform any of the processes of the present invention. The user interfaces may be using webpages, apps, chatbots, and/or other means of communication and interaction with the user. The storage media can include, but are not limited to, magneto-optical disks, ROMs, RAMs, flash memory devices, or any type of media or devices suitable for storing instructions, codes, and/or data.

Figure 1:
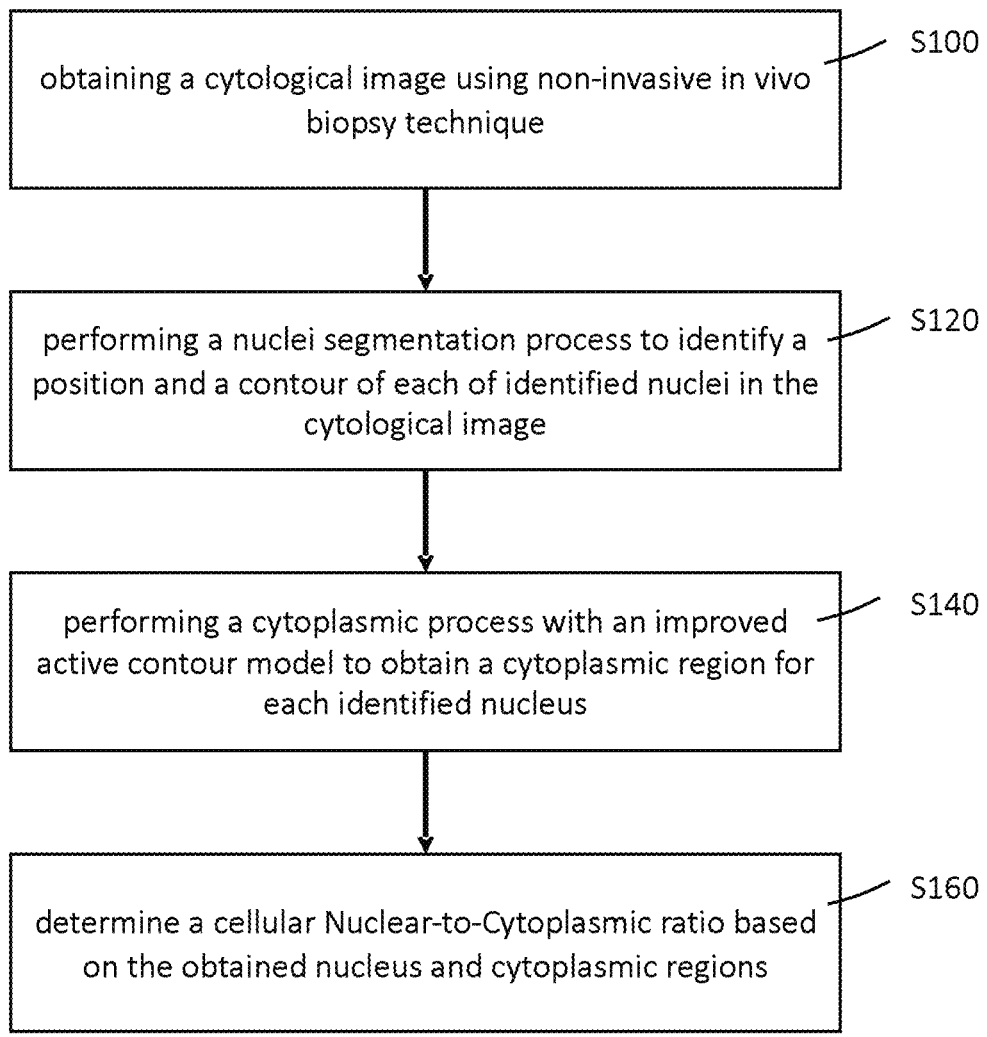
FIG. 1 is a flowchart illustrating the method for determining cellular Nuclear-to-Cytoplasmic ratio in accordance with an embodiment of the present invention.
Figure 2A:
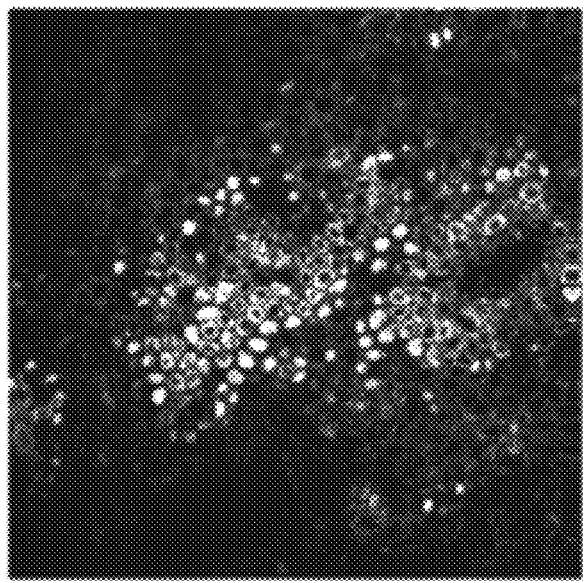
FIG. 2A is an exemplary diagram of an original acquired Third Harmonic Generation (THG) microscopy image.

With reference to FIGS. 1 and 2A, FIG. 1 is a flowchart illustrating the method for determining cellular Nuclear-to-Cytoplasmic ratio in accordance with an embodiment of the present invention; FIG. 2A is an exemplary diagram of an original acquired Third Harmonic Generation (THG) microscopy image. In this embodiment, as shown in FIG. 1, the method for determining cellular Nuclear-to-Cytoplasmic ratio comprises acts of S100 obtaining a cytological image using non-invasive in vivo biopsy technique; S120 performing a nuclei segmentation process to identify a position and a contour of each of identified nuclei in the cytological image; S140 performing a cytoplasmic process with an improved active contour model to obtain a cytoplasmic region for each identified nucleus; and S160 determine a cellular Nuclear-to-Cytoplasmic ratio based on the obtained nuclei and cytoplasmic regions.

In act S100, the cytological image or biomedical image may be obtained using non-invasive in vivo biopsy technique that acquire the cells or tissues to be analyzed and cell segmentation. In order to have the capability to achieve noninvasive, high resolution and high penetration simultaneously, Higher Harmonic Generation Microscopy (HHGM) utilizing Third Harmonic Generation (THG) modality is an emerging and promising optical virtual biopsy tool applied to wide ranges of biomedical inspections. THG intensity depends on the cubic of the incident light source, it can provide the characteristic of high depth resolution. However, as shown in FIG. 2A, the THG image may have some noise corruption, and the intensity of cells such as contrast, edges and contour in the THG image are often inconsistent, and thus an image preprocessing is required before performing cell segmentation. In this embodiment, the image resolution of acquired THG image is 512×512 pixels and stored in 12-bit gray-level TIFF format with lossless compression. However, the cytological image of the present invention is not limited to THG image, it can be obtained from different non-invasive vivo biopsy techniques.

Figure 2B:
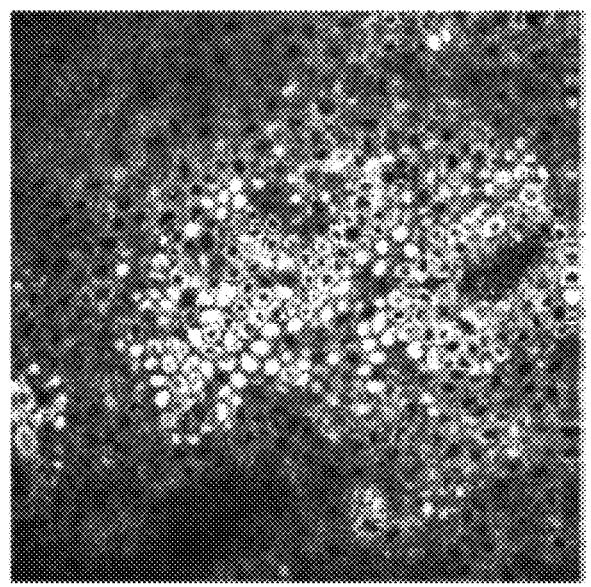
FIG. 2B is an exemplary diagram of a preprocessed THG microscopy image.
Figure 3:
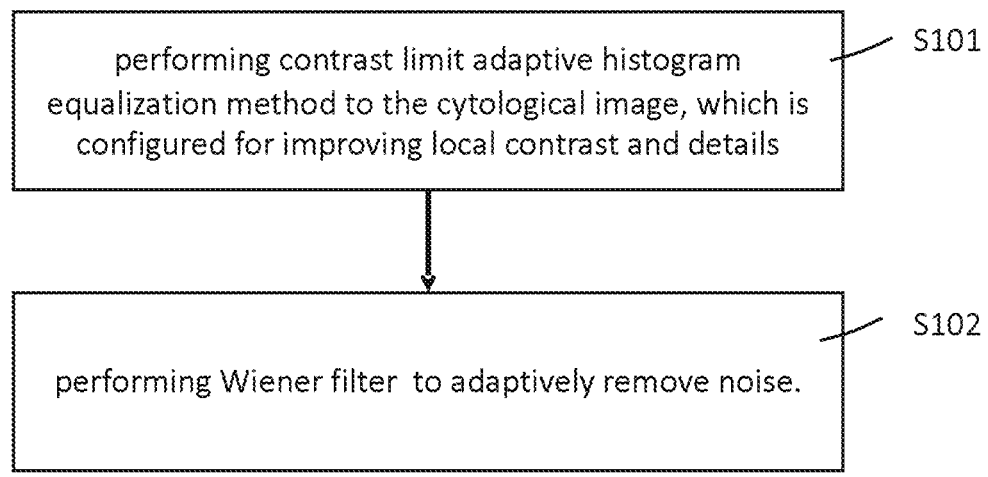
FIG. 3 is a flowchart illustrating acts of preprocessing the cytological image in act S100 in accordance with an embodiment of the present invention.

With further reference to FIGS. 2B and 3, FIG. 2B is an exemplary diagram of a preprocessed THG microscopy image, and FIG. 3 is a flowchart illustrating acts of preprocessing the cytological image in act S100 in accordance with an embodiment of the present invention. As shown in FIG. 3, an act of S101 performing contrast limit adaptive histogram equalization method (CLAHE) to the cytological image, which is configured for improving local contrast and details. The image preprocessing may further comprise an act of S102 performing Wiener filter to adaptively remove noise. FIG. 2A shows the preprocessed THG image.

Figure 4A:
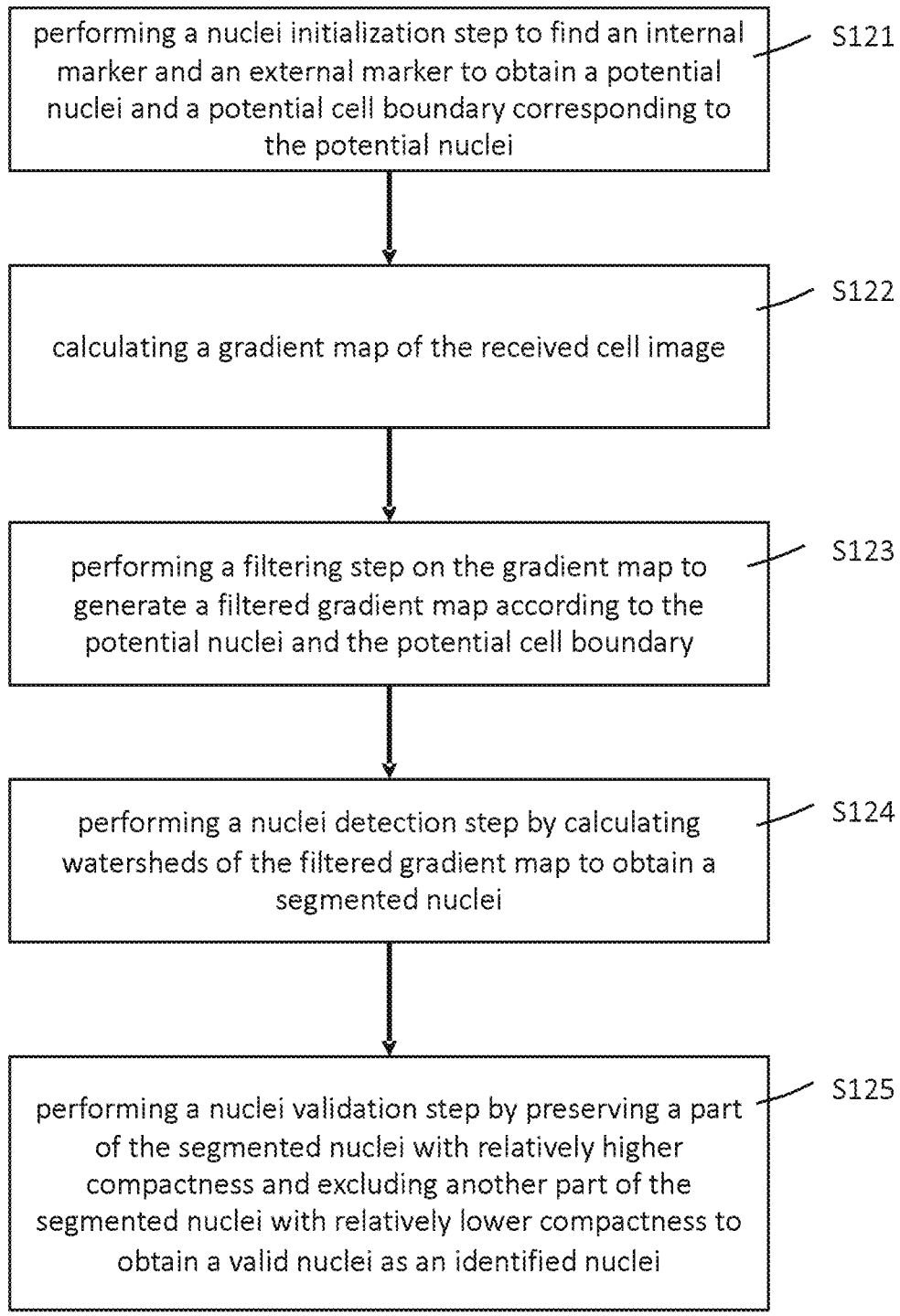
FIG. 4A is a flowchart illustrating acts of performing a nuclei segmentation process to identify a position and a contour of each of identified nuclei in the cytological image.
Figure 4B:
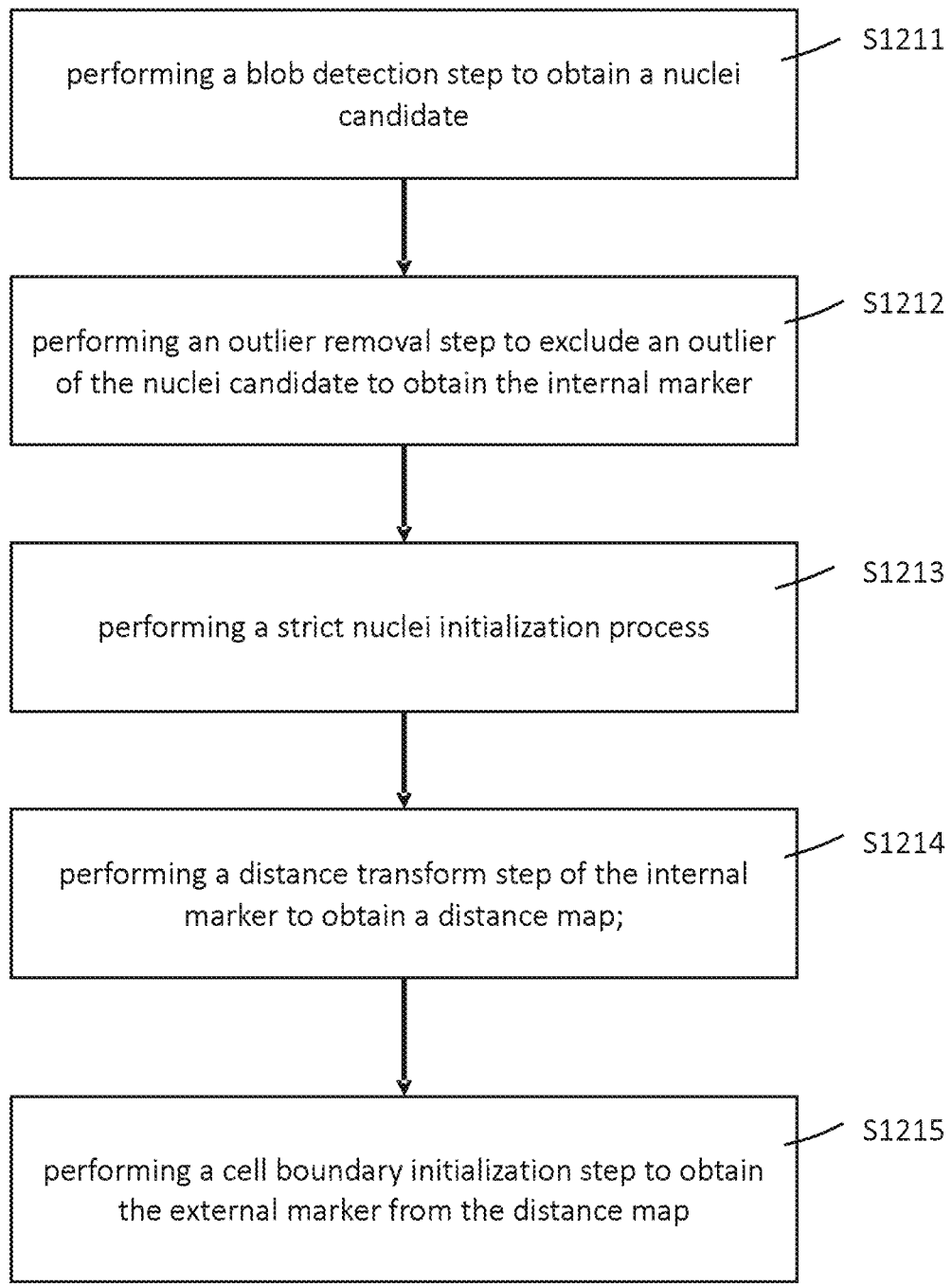
FIG. 4B is a flowchart illustrating steps of nuclei initialization according to FIG. 4A.

With reference to FIGS. 1, 4A and 4B, FIG. 4A is a flowchart illustrating acts of performing a nuclei segmentation process to identify a position and a contour of each of identified nuclei in the cytological image; FIG. 4B is a flowchart illustrating steps of nuclei initialization according to FIG. 4A. The act of S120 further comprises acts to be performed using gradient watershed transformation with marker-controlled strategy, blob detection, and consideration of shape descriptors to obtain accurate segmented nuclei. Nuclei segmentation is a crucial stage in the proposed cell segmentation algorithm since the following cytoplasm segmentation will desire to reference valid nuclei which can be thought of as initial condition of the optimization problem of whole cell segmentation to guide the algorithm to find the feasible solution with high performance.

Accordingly, as shown in FIG. 4A, the nuclei segmentation process comprises acts of S121 performing a nuclei initialization step to find an internal marker and an external marker to obtain a potential nuclei and a potential cell boundary corresponding to the potential nuclei; S122 calculating a gradient map of the received cell image; S123 performing a filtering step on the gradient map to generate a filtered gradient map according to the potential nuclei and the potential cell boundary; S124 performing a nuclei detection step by calculating watersheds of the filtered gradient map to obtain a segmented nuclei; S125 performing a nuclei validation step by preserving a part of the segmented nuclei with relatively higher compactness and excluding another part of the segmented nuclei with relatively lower compactness to obtain a valid nucleus as an identified nucleus. The detailed description of the nuclei segmentation process can be found in the U.S. Pat. No. 9,122,907 which is filed by a joint inventor to the present invention, and thus the disclosure of which are incorporated herein by reference in their entirety.

In contrast to the U.S. Pat. No. 9,122,907 and the present disclosure, which the present further disclosure an utilized a strict nuclei initialization that eliminates disqualified nuclei detection by shape information that is derived from Hough transform, labeling information and actual cell size to help designing a marker filter with more accurate nuclei position for subsequent nuclei segmentation.

In an embodiment, as shown in FIG. 4B, the nuclei initialization step comprises acts of S1211 performing a blob detection step to obtain a nuclei candidate; S1212 performing an outlier removal step to exclude an outlier of the nuclei candidate to obtain the internal marker; S1213 performing a strict nuclei initialization process, S1214 performing a distance transform step of the internal marker to obtain a distance map; and S1215 performing a cell boundary initialization step to obtain the external marker from the distance map.

The acts of S1211, S1212, S1214 and S1215 are disclosed and described in U.S. Pat. No. 9,122,907. Considering the characteristic of nuclei in THG images which is regional intensity minimum surrounded by pixels of higher intensity, the position of nuclei candidates with blob detection is initially obtained. The preprocessed image is spanned into the Gaussian scale-space for the purpose to extract structure of interest with the scale and spatial information simultaneously. The 2nd-order Hessian matrix presented by scale-space derivatives is used to estimate the existence of regional minimum and enhance those round valley feature. The potential nuclei by simply removing some outliers with local intensity constraint.

However, only using local intensity constraint to remove possible outlier is insufficient due to it lacks shape information. It reserves many nuclei-like candidates after performing simple intensity constraint, such as nuclei candidates in intercellular space or some within tissues with sparse intensity. To enhance the accuracy of determining the position of the potential nuclei, the act of S1213 is configured to re-inspect those potential nuclei candidates by providing an ellipse shape descriptor, and thus the present disclosure combines the features of both local intensity information and ellipse shape information simultaneously to provide a firm representation of nuclei.

Figure 5:
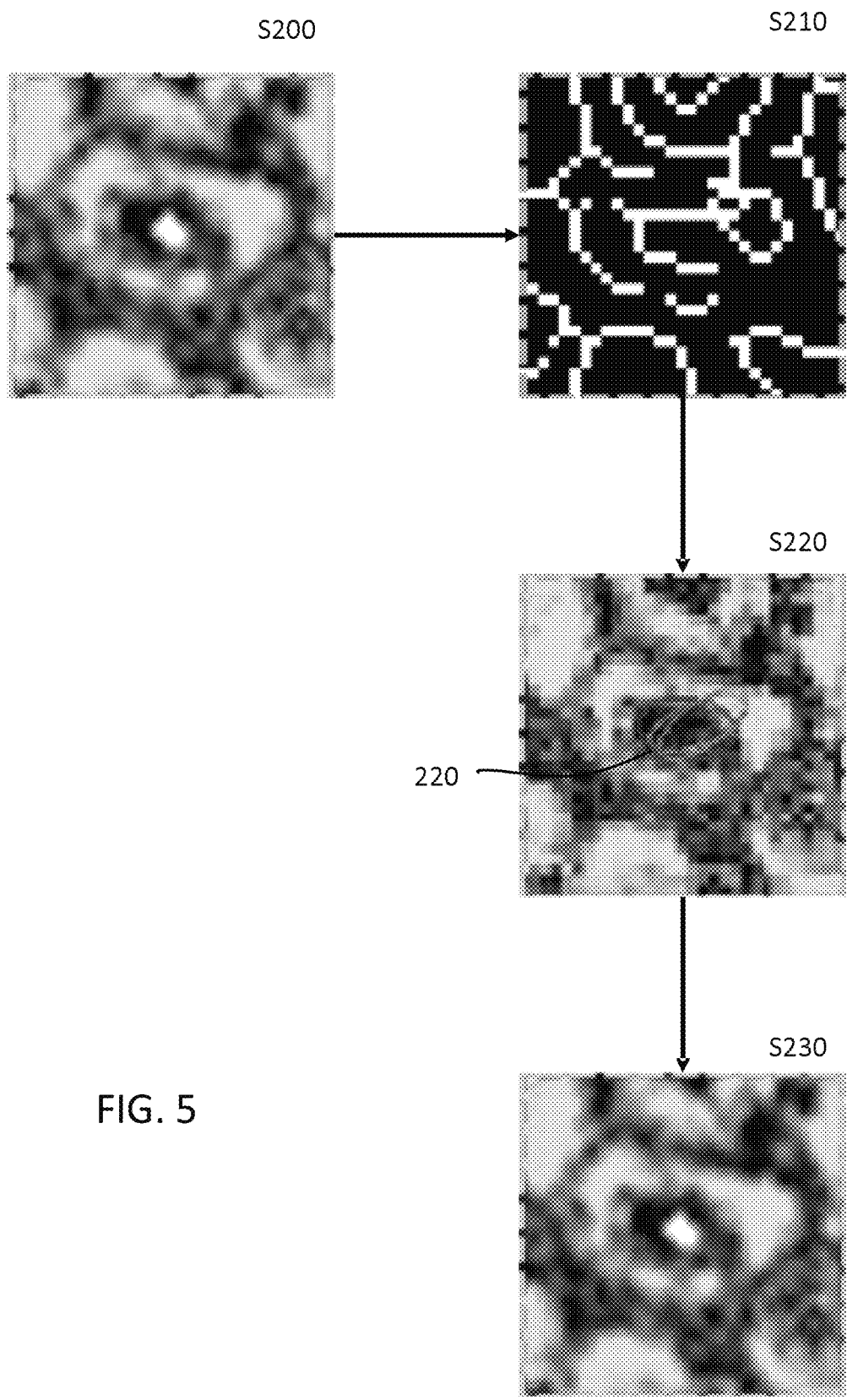
FIG. 5 is exemplary diagrams illustrating the acts of performing a strict nuclei initialization process.

With reference to FIG. 5, FIG. 5 is exemplary diagrams illustrating the acts of performing a strict nuclei initialization process. In an embodiment, as shown in FIG. 5, the strict nuclei initialization process comprises acts of S200 obtaining sub-images from the cytological image; S210 identifying a contour with edge detection in the sub-image; S220 extracting prominent ellipses with identified contour from each of sub-images using an ellipse Hough transform; and S230 re-inspecting the nuclei candidates based on the center of the prominent ellipses.

In act of S200, since we are only interested in the shape of the potential nuclei, and the average Nuclear Diameter (ND) of basal cell in the in vivo cytological analysis is about 4.9 um (it is about 10 pixels length in the normal THG image), the sub-image is retrieved with smaller scale from the cytological image. In an embodiment, the size of the sub-image is three times of the average ND size, which is about 30×30 pixels from the position of each potential nuclei. However, the scale of sub-image size is alterable for including all possible area of nuclei area without involving too much information.

In act of S210, the delineation of the contour in the sub-image is an essential stage for shape description, thus we can adopt the edge detection method to concentrate on the shape's border. Edge is where the pixels with sharply change in intensity. In an embodiment, the multi-directional Sobel operator and Laplacian operator, which the $1^{st}$-order derivative and $2^{nd}$-order derivative are respectively used for edge identification. According to inventor's experiment, using Laplacian operator with $2^{nd}$-order derivative image could provide more edge information than Sobel operator, but may also cause too many vague edge or unrealistic edge of nuclei. Therefore, in present disclosure, Sobel operator is preferable used for identifying a contour of the nuclei edge.

After acquiring the initial edge within the sub-images, the act of S220 adopted Hough transform as shape extractor in describing the edge contour of potential nuclei. The Hough transform is a feature extraction technique based on the concept of shape matching to detect the curves in image. Furthermore, cellular nuclei shapes vary from one to another in THG images. To describe the shape of the nuclei, we use ellipse Hough transform due to the flexibility of varying from very flat ellipse to almost circular one.

After applying the ellipse Hough transform to find prominent ellipses 220 with corresponding parameters in describing the edge of potential nuclei, we adopted ellipse selection mechanism (i.e., the act of S230) to combine the description of ellipse with location of potential nuclei to re-inspect i the nuclei candidate is in an elliptical shape. The ellipse selection checks the distance between the center of potential nuclei Ci and the center of detected prominent ellipse Ce. If the distance between the center of potential nuclei Ci and the center of detected prominent ellipse Ce is smaller than the average radius of the nuclei, then re-inspect as a nucleus, and if not, the candidate nucleus is eliminated.

Figure 6:
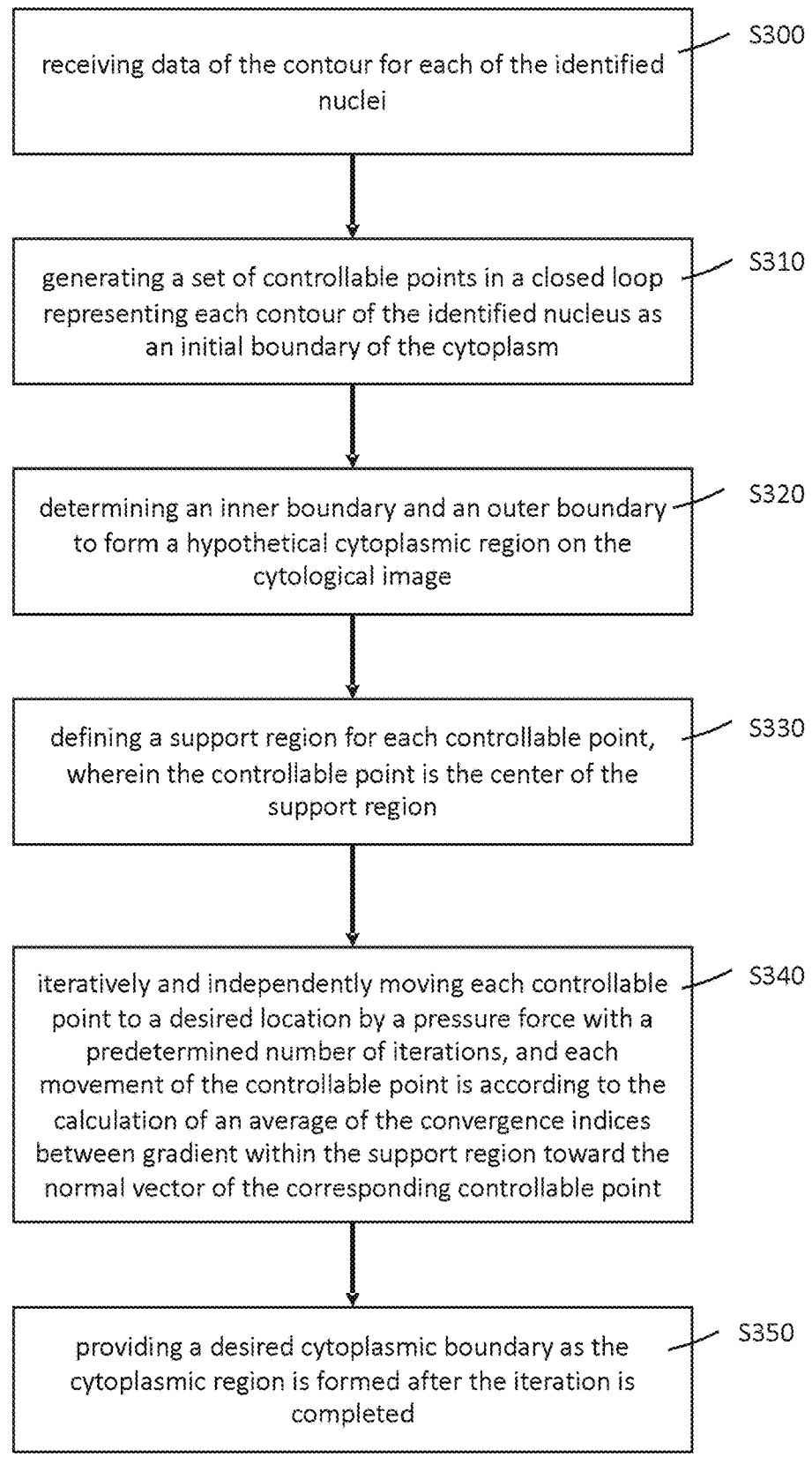
FIG. 6 is a flowchart illustrating the act of performing a cytoplasmic process in accordance with an embodiment of the present invention.

With reference to FIGS. 1 and 6, FIG. 6 is a flowchart illustrating the act of performing a cytoplasmic process in accordance with an embodiment of the present invention. In this embodiment, as shown in FIG. 6, the act of S140 performing a cytoplasmic process with an improved active contour model to obtain a cytoplasmic region for each identified nucleus based, comprises acts of S300 receiving data of the contour for each of the identified nuclei; S310 generating a set of controllable points in a closed loop representing each contour of the identified nucleus as an initial boundary of the cytoplasm; S320 determining an inner boundary and an outer boundary to form a hypothetical cytoplasmic region on the cytological image, wherein within the hypothetical cytoplasmic region; S330 defining a support region for each controllable point, wherein the controllable point is the center of the support region; S340 iteratively and independently moving each controllable point to a desired location by a pressure force with a predetermined number of iterations, and each movement of the controllable point is according to the calculation of an average of the convergence indices between gradient within the support region toward the normal vector of the corresponding controllable point; and S350 providing a desired cytoplasmic boundary as the cytoplasmic region is formed after the iteration is completed.

Active contour model, also called snake, is adopted as our base approach to achieve cytoplasm segmentation, which delineates boundary of cell in THG microscopy images. From the essential characteristic of snake that could be described as a closed curve, the traditional issue of detecting and linking boundary could be resolved. Additionally, the snake is an energy minimizing curve which transforms the image segmentation problem into an energy optimization process, and thus giving a systematic approach for cytoplasm segmentation.

However, the snake usually suffers from well-known drawbacks of initialization and parameterization in the traditional model. To detect cytoplasm boundary with an admissible initialization automatically, the initial snake curve would be put on the location of detected nuclear boundary which is contained within target cytoplasm boundary. Although initializing snake on the detected nuclei boundary is theoretically a good beginning, we encounter the initial minimum problem while in the actual implementation.

Accordingly, an improved active contour model (i.e., a statistical pressure snake based on the balloon snake) is introduced in the present disclosure. The improved active contour model is configured for joining the contextual and locality information of image data into energy minimization process to make the snake more converge to the cytoplasm outer boundary with the initial contour on nuclei border. The proposed statistical pressure snake considering the contextual information in image domain not only adapts to different cell structure during each process of cytoplasmic boundary detection, but also becomes an optimal parameter setting snake.

Figure 7:
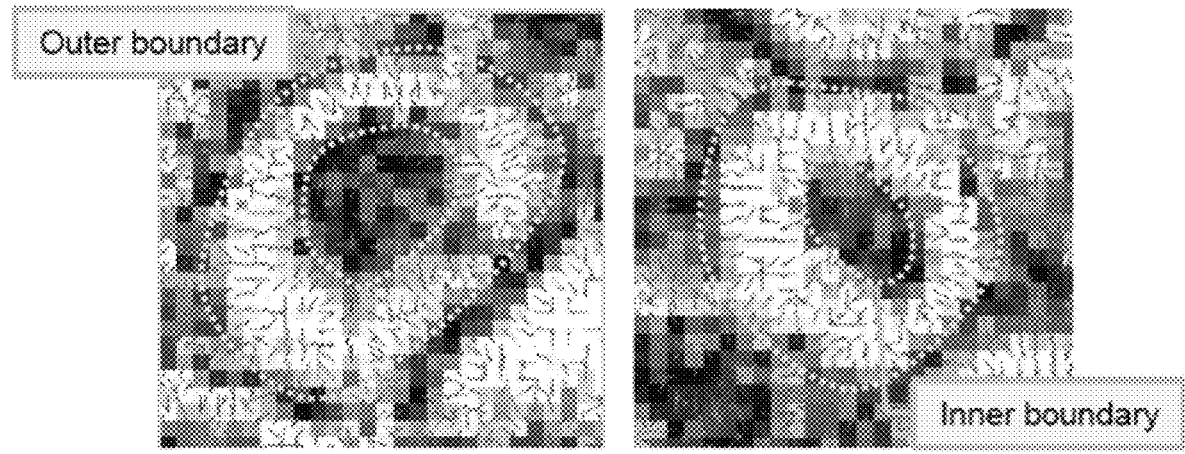
FIG. 7 is an exemplary diagram illustrating a snake curve with inflation and deflation pressure force.

With reference to FIG. 7, FIG. 7 is an exemplary diagram illustrating a snake curve with inflation and deflation pressure force. The inspiration of the statistical pressure snake comes from several assumptions and the observation of the cell. In the first place, assume that the orientation and magnitude of normal vector-pressure force on each snake controllable point (the act of 310). In the next place, we assume that the shape of cytoplasm and corresponding nuclei is round shape, convex regions, and almost concentric. As shown in FIG. 7, the hypothetical cytoplasmic region comprises multiple outward-pointing gradient vectors distributed along the inner boundary, and multiple inward-pointing gradient vectors distributed along the outer boundary.

The assumptions and the observation provide a potential relationship between the movement of snake contour and the image data over cytoplasm region. Hence, we established a link between the directional information of pressure force on snake and the contextual information of gradient vectors derived from image data by virtue of a measurement—the extent of convergence, to motivate the optimization of pressure snake more adaptive to local structure of each cell, and also avoid tuning the parameters manually. The proposed statistical pressure snake calculates the extent of local convergence of the image gradient vectors toward the outward-pointing normal vector of the controlled points on the snake contour as the measurement to influence the pressure snake movement during the optimization process.

Figure 8:
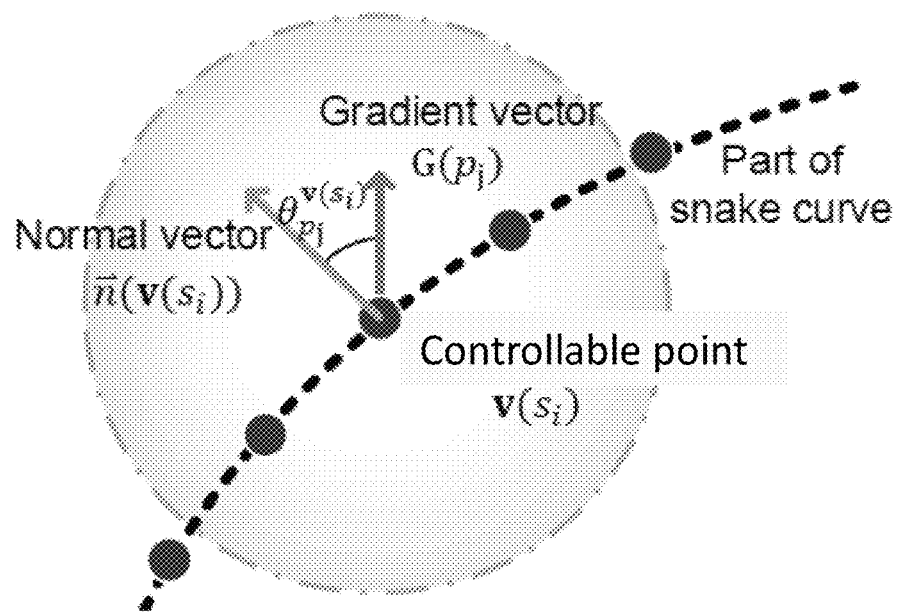
FIG. 8 is an exemplary diagram of the support region of convergence control factor controlling the controllable points.

With reference to FIG. 8, FIG. 8 is an exemplary diagram of the support region of convergence control factor controlling the controllable points. As shown in FIG. 8, in the act of S330, a support region SR is defined for each controllable point, and the controllable point is the center of the support region. The measurement of the convergent extent provides a guideline on the movement of snake that the snake is able to inflate or deflate like a balloon, and we call the measurement a convergence control factor $C(v(s))$. The pressure force $F_{pressure}$ is now further defined as following equation:

$$F_{pressure}=c(v(s))\times n(v(s)).$$

$n(v(s))$ is the normal vector on each controllable point. $C(v(s))$ is a convergence control factor controlling the pressure force that is applied to the controllable point, which calculates the statistics of the directional convergence.

The convergence control factor is defined as following relation:

$$C(v(s)) = \frac{1}{N}\Sigma_{P_j\in SR} \cos\theta_{p_j}^{v(s)}, \text{ wherein}$$

$$\cos\theta_{p_j}^{v(s)} = \cos(\varphi(\tilde{n}(v(s))) - \varphi(p_j)),$$

$$\varphi(\tilde{n}(v(s))) = \tan^{-1}\left(\frac{\tilde{n}_y(v(s))}{\tilde{n}_x(v(s))}\right),$$

$$\varphi(p_j) = \tan^{-1}\left(\frac{G_y(p_j)}{G_x(p_j)}\right).$$

In an embodiment, the result of the calculation of the convergence control factor is normalized in a range of −1 to 1. where SR is the abbreviation of support region which could be thought of as an interested locality around each controlled point of snake curve, as shown in FIG. 8 a SR is center at a controlled point $v(s_i)$, N is the number of image pixels within the SR and $p_j$ represents image pixels, $\varphi(p_j)$ is the orientation of the gradient vector $G(p_j)$ on pixel $p_j$, and is calculated from $Gx(p_j)$ and $Gy(p_j)$ which are first derivatives of image intensity at pixel pj in horizontal and vertical directions, respectively, $\varphi(n(v(s)))$ is the orientation of normal vector calculated from x- and y-components of normal vector, $\cos\theta_{p_j}^{v(s)}$ is the convergence index indicating the directional similarity between the gradient vector $G(p_j)$ at pixel pj and normal vector $n^-(v(s))$.

According to the observation in FIG. 7, $C(v(s))$ would have positive value from the interior cytoplasmic boundary, which means large directional similarity, thus it inflates snake. While getting close to the exterior cytoplasmic boundary where $C(v(s))$ becomes negative which means low directional similarity, the snake would gradually deflate. With the consideration of contextual information, we could adaptively determine the pressure force, producing an appropriate evolution of snake toward the desired solution.

Consequently, using the convergence control factor to the parameterization problem of original balloon snake for escaping initial minimum and searching fitting cytoplasmic boundary without overstretch for individual cell. Based on the essential characteristic of snake, the statistical pressure snake becomes a systemic and adaptive approach for the cytoplasm segmentation for THG images.

In another embodiment, the pressure force $F_{pressure}$ may further comprises a shifting parameter configured for ensuring each movement of the controllable point would pass through the local minimum of inner cytoplasmic boundary. In this embodiment, a shifting parameter $\hat{S}$ combining with $C(v(s))$ for pressure force denoted as:

$$F_{pressure}=c(v(s)+\hat{S})\times n(v(s)).$$

wherein $\hat{S}=\max\|F_{img}(v(s))\|$

The shifting parameter considers the maximum magnitude of the image force of entire snake during each minimization process. The use of $\hat{S}$ is responsible for ensuring the initial snake would pass through the local minimum of inner cytoplasmic boundary. Besides, when part of snake slither to homogeneous regions with both low pressure force and low image force, $\hat{S}$ provides additional fuel, and hence the snake could still have force to move outward. When snake is about to approaching the outer boundary of cytoplasm, the image force of the cytoplasm boundary would dominate the snake movement because the convergence control factor counteracts the shifting parameter, thus the energy minimization would carry the rest of the way to find the desired cytoplasm boundary.

Figure 9A:
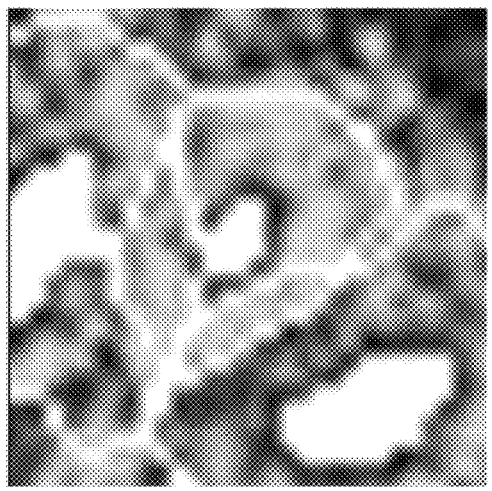
FIG. 9A is an exemplary diagram illustrating separating adjacent cell without dividing line.
Figure 9B:
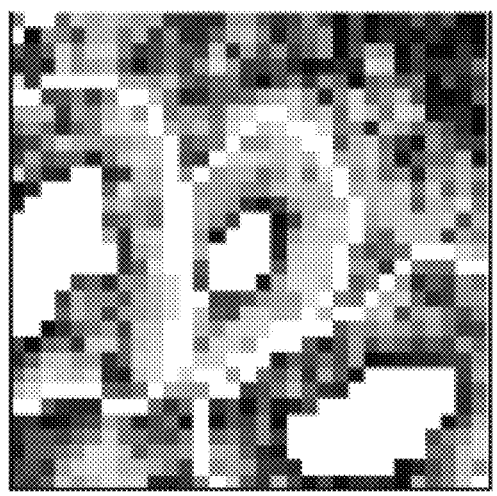
FIG. 9B is an exemplary diagram illustrating separating adjacent cell without dividing line.

With reference to FIGS. 9A and 9B, FIG. 9A is an exemplary diagram illustrating separating adjacent cell without dividing line; and FIG. 9B is an exemplary diagram illustrating separating adjacent cell without dividing line. For each cell nuclei, the corresponding cytoplasm boundary can be detected based on the local cell structure by using the proposed statistical pressure snake. However, the detection of cytoplasm is performed on each individual cell, and thus, as shown in FIG. 9A, the overlapping problem occurred when the basal cells touch with each other. Back to the essential energy formulation of snake and inspiration of the statistical pressure snake, there has no apparent local minimum on the boundary of adjacent cell, besides, the gradient vector pattern of adjacent cells does not obey our original observation. Therefore, the statistical pressure snake won't converge to the correct cytoplasm boundary and the overlapping problem appears.

As shown in FIG. 9B, the dividing line of cells with reasonable cell distance are created, the Euclidean distance transform is adopted to separate the touch cells when implement the statistical pressure snake. The Euclidean distance transform generates a distance map from a binary image which labels each pixel with distance between that pixel and the nearest non-zero pixel in binary image using Euclidean distance metric.

Figure 10A:
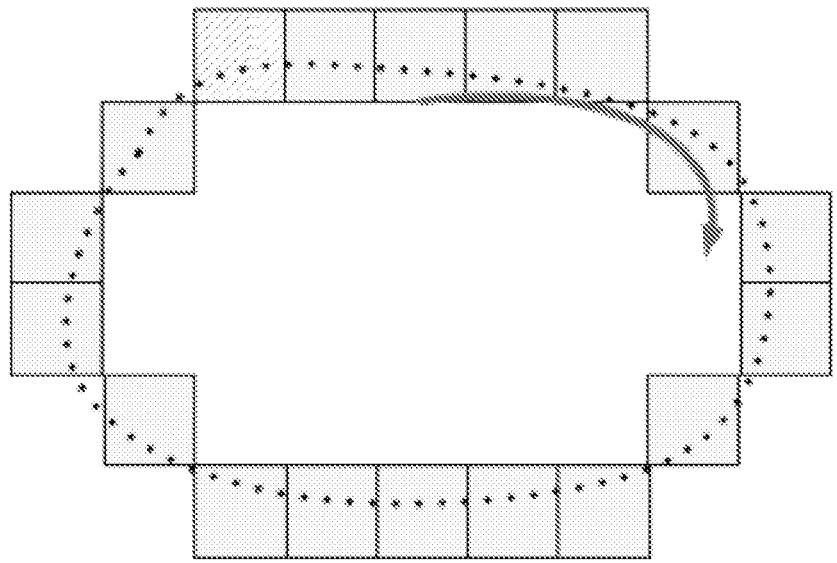
FIG. 10A is an exemplary diagram of a non-self-intersection discrete accumulator.
Figure 10B:
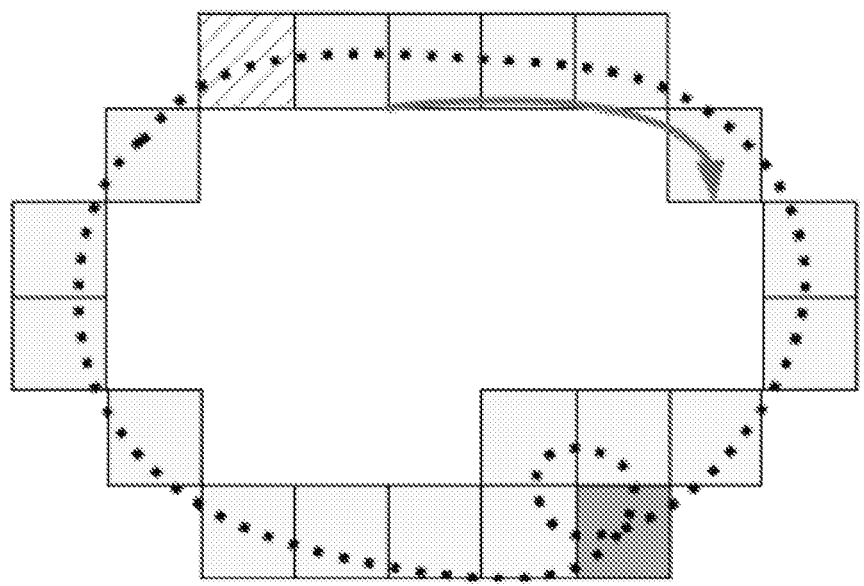
FIG. 10B is an exemplary diagram of a self-intersection discrete accumulator.
Figure 11:
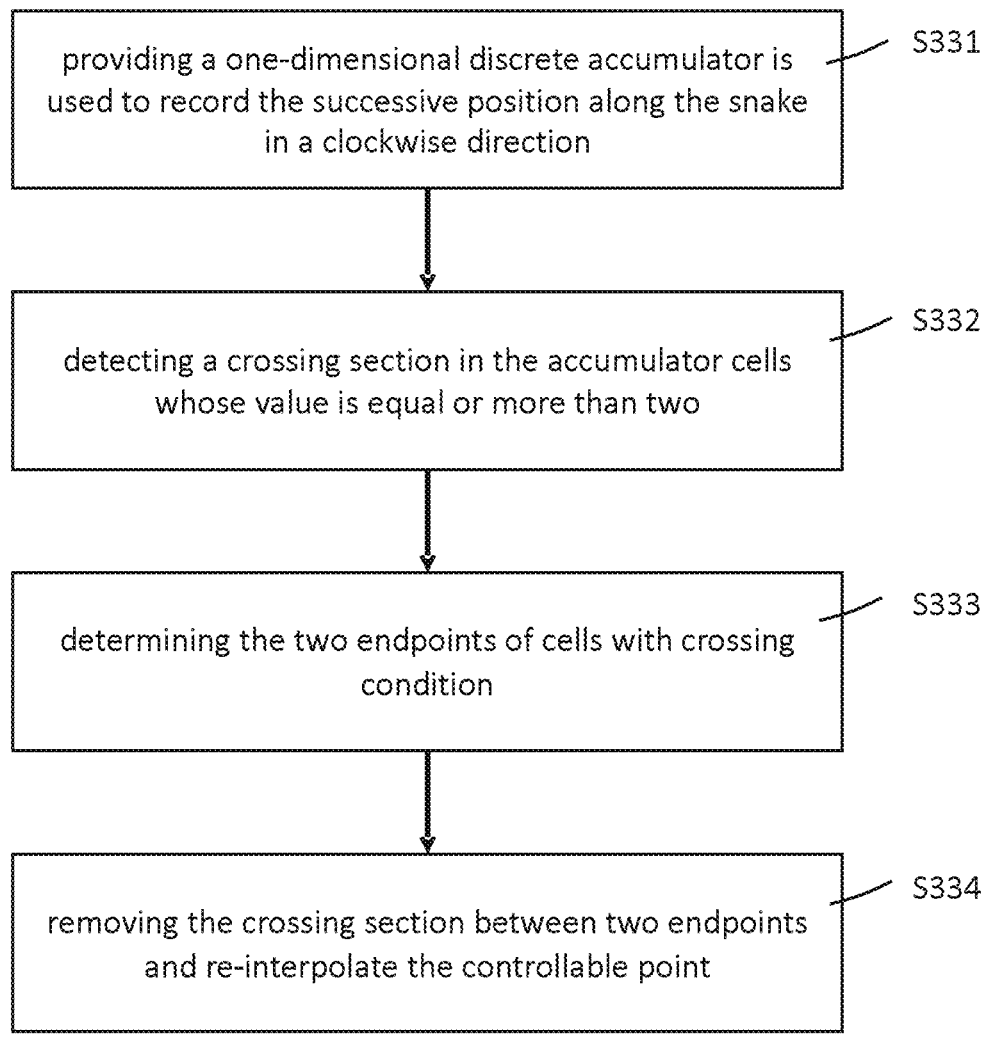
FIG. 11 is a flowchart illustrating acts of detecting and removing self-intersection in accordance with an embodiment of the present invention.

With reference to FIGS. 10A, 10B and FIG. 11, FIG. 10A is an exemplary diagram of a non-self-intersection discrete accumulator; FIG. 10B is an exemplary diagram of a self-intersection discrete accumulator; and FIG. 11 is a flowchart illustrating acts of detecting and removing self-intersection in accordance with an embodiment of the present invention. In statistical pressure snake, the magnitude of pressure force adaptively changes according to the convergent extent between snake movement and gradient vector. Nonetheless, the final direction of snake movement relies on both pressure force and image force. If some parts of the snake move faster than others under the influence of external force, those parts of curve may cross each other, leading to unstable behavior.

Accordingly, as shown in FIG. 11, the present disclosure further comprises acts of S331 providing a one-dimensional discrete accumulator is used to record the successive position along the snake in a clockwise direction; S332 detecting a crossing section in the accumulator cells whose value is equal or more than two; S333 determining the two endpoints of cells with crossing condition; and S334 removing the crossing section between two endpoints and re-interpolate the controllable point.

Finally, for act of S160 as shown in FIG. 1, after performing the cell segmentation algorithm, we obtained the nuclei and cytoplasmic region. The cellular and nuclear size is an indicator for quantifying some physical factors like skin aging, besides it may able to quantify the developing status of some diseases.

In addition to the analysis of the cellular and nuclear area, the Nuclear-to-Cytoplasmic ratio is a common measurement used in medical diagnosis, which is defined as the volume ratio of nuclei to cytoplasm in cytology. For example, the NC ratios of the skin epidermis for some skin diseases like Actinic Keratosis and Squamous Cell Carcinoma are commonly larger than that in the normal skin. Although NC ratio is defined in volume ratio, the area ratio of nuclei to cytoplasm is reasonably approximated to NC ratio evaluation due to that they both use ratio analysis. Therefore, whether we use the estimation of the volume ratio or area ratio, their analyzed ratio will be close owing to the difference are obliterated by ratio analysis. Another reason for using area ratio to approach volume ratio comes from the idea of 3D reconstruction that each three-dimensional cell can be reconstructed from many two-dimensional cell slices. Therefore, we could calculate a lot of image slices with NC ratio evaluation to approach the volume ratio. Besides, in order to increase the evaluation for the cellular, nuclear size and NC ratio, the proposed algorithm provides an enhanced protocol for cell segmentation.

The invention claimed is:

1. A method for determining cellular Nuclear-to-Cytoplasmic ratio, comprising acts of:

obtaining a cytological image using non-invasive in vivo biopsy technique;

performing a nuclei segmentation process to identify a position and a contour of each of identified nuclei in the cytological image;

performing a cytoplasmic process with an improved active contour model to obtain a cytoplasmic region for each identified nucleus based; and calculating areas of each identified nucleus and the corresponding cytoplasmic region to determine a cellular Nuclear-to-Cytoplasmic ratio, wherein the act of performing the cytoplasmic process with the improved active contour model comprises acts of:

receiving data of the contour for each of the identified nuclei;

generating a set of controllable points in a closed loop representing each contour of the identified nucleus as an initial boundary of the cytoplasm;

determining an inner boundary and an outer boundary to form a hypothetical cytoplasmic region on the cytological image, wherein within the hypothetical cytoplasmic region, the hypothetical cytoplasmic region comprises multiple outward-pointing gradient vectors distributed along the inner boundary; and multiple inward-pointing gradient vectors distributed along the outer boundary;

defining a support region for each controllable point, wherein the controllable point is the center of the support region;

iteratively and independently moving each controllable point to a desired location by a pressure force with a predetermined number of iterations, and each movement of the controllable point is according to the calculation of an average of the convergence indices between gradient within the support region toward the normal vector of the corresponding controllable point; and providing a desired cytoplasmic boundary as the cytoplasmic region is formed after the iteration is completed.

2. The method as claimed in claim 1, wherein the pressure force has a relation of $$F_{pressure}=c(v(s))\times n(v(s))$$

wherein, the $n(v(s))$ is the normal vectors on each controllable point; and the $C(v(s))$ is a control factor controlling the pressure force that is applied to the controllable point which calculates the statistics of the directional convergence, and has a relation of $$C(v(s)) = \frac{1}{N}\Sigma_{Pj \in SR} \cos \theta_{p_j}^{v(s)} \text{ with}$$

$$\cos \theta_{p_j}^{v(s)} = \cos(\varphi(\tilde{n}(v(s))) - \varphi(p_j)),$$

$$\varphi(\tilde{n}(v(s))) = \tan^{-1}\left(\frac{\tilde{n}_y(v(s))}{\tilde{n}_x(v(s))}\right),$$

$$\varphi(p_j) = \tan^{-1}\left(\frac{G_y(p_j)}{G_x(p_j)}\right),$$

wherein, the result of the calculation of the convergence control factor is normalized in a range of −1 to 1. where SR is the abbreviation of support region which could be thought of as an interested locality around each controlled point of snake curve, a SR is center at a controlled point $v(s_i)$, N is the number of image pixels within the SR and pj represents image pixels, $\Phi(p_j)$ is the orientation of the gradient vector $G(p_j)$ on pixel $p_j$, and is calculated from $Gx(p_j)$ and $Gy(p_j)$ which are first derivatives of image intensity at pixel $p_j$ in horizontal and vertical directions, respectively, $\Phi(n(v(s)))$ is the orientation of normal vector calculated from x- and y-components of normal vector, $\cos \theta_{p_j}^{v(s)}$ is the convergence index indicating the directional similarity between the gradient vector G(pj) at pixel pj and normal vector n¯ (v(s)).

3. The method as claimed in claim 1, wherein the pressure force further comprises a shifting parameter configured for ensuring each movement of the controllable point would pass through the local minimum of inner cytoplasmic boundary.

4. The method as claimed in claim 1, wherein the pressure force has a relation of $$F_{pressure} = c(v(s) + \hat{S}) \times n(v(s))$$

wherein, $\hat{S}=\max\|F_{img}(v(s))\|$ is shifting parameter considers the maximum magnitude of the image force of entire snake during each minimization process, and configured for ensuring each movement of the controllable point would pass through the local minimum of inner cytoplasmic boundary;

the n(v(s)) is the normal vectors on each controllable point; and the C(v(s)) is a control factor controlling the pressure force that is applied to the controllable point which calculates the statistics of the directional convergence, and has a relation of $$C(v(s)) = \frac{1}{N}\Sigma_{Pj \in SR} \cos \theta_{p_j}^{v(s)} \text{ with}$$

$$\cos \theta_{p_j}^{v(s)} = \cos(\varphi(\tilde{n}(v(s))) - \varphi(p_j)),$$

$$\varphi(\tilde{n}(v(s))) = \tan^{-1}\left(\frac{\tilde{n}_y(v(s))}{\tilde{n}_x(v(s))}\right),$$

$$\varphi(p_j) = \tan^{-1}\left(\frac{G_y(p_j)}{G_x(p_j)}\right),$$

wherein, the result of the calculation of the convergence control factor is normalized in a range of −1 to 1, where SR is the abbreviation of support region which could be thought of as an interested locality around each controlled point of snake curve, a SR is center at a controlled point $v(s_i)$, N is the number of image pixels within the SR and pj represents image pixels, $\Phi(p_j)$ is the orientation of the gradient vector $G(p_j)$ on pixel $p_j$, and is calculated from $Gx(p_j)$ and $Gy(p_j)$ which are first derivatives of image intensity at pixel $p_j$ in horizontal and vertical directions, respectively, $\Phi(n(v(s)))$ is the orientation of normal vector calculated from x- and y-components of normal vector, $\cos \theta_{p_j}^{v(s)}$ is the convergence index indicating the directional similarity between the gradient vector $G(p_j)$ at pixel $p_j$ and normal vector n¯ (v(s)).

5. The method as claimed in claim 1, further comprising an act of separating an overlapped cytoplasmic region using a Euclidean distance transform is adopted to separate the touch cells when implement the statistical pressure snake.

6. The method as claimed in claim 1, further comprising acts of avoiding self-intersection, which comprises
providing a one-dimensional discrete accumulator is used to record the successive position along the snake in a clockwise direction;
detecting a crossing section in the accumulator cells whose value is equal or more than two;
determining the two endpoints of cells with crossing condition; and
removing the crossing section between two endpoints and re-interpolate the controllable point.

7. The method as claimed in claim 1, wherein the act of obtaining the cytological image further comprises acts of
performing a contrast limit adaptive histogram equalization method to enhance the contrast and details in the cytological image; and
performing a Wiener filter to adaptively remove noise.

8. The method as claimed in claim 1, wherein the act of performing the nuclei segmentation process comprises acts of
performing a nuclei initialization step to find an internal marker and an external marker to obtain a potential nucleus and a potential cell boundary corresponding to the potential nuclei, wherein the nuclei initialization step comprises
performing a blob detection step to obtain a nuclei candidate;
performing an outlier removal step to exclude an outlier of the nuclei candidate to obtain the internal marker;
performing a distance transform step of the internal marker to obtain a distance map; and
performing a cell boundary initialization step to obtain the external marker from the distance map;
calculating a gradient map of the received cell image;
performing a filtering step on the gradient map to generate a filtered gradient map according to the potential nuclei and the potential cell boundary;
performing a nuclei detection step by calculating watersheds of the filtered gradient map to obtain a segmented nucleus;
performing a nuclei validation step by preserving a part of the segmented nuclei with relatively higher compactness and excluding another part of the segmented nuclei with relatively lower compactness to obtain a valid nucleus as an identified nucleus.

9. The method as claimed in claim 8, wherein the nuclei initialization step further comprises an act of performing a strict nuclei initialization process to eliminates disqualified nuclei detection by shape information that is derived from Hough transform.

10. The method as claimed in claim 9, wherein the strict nuclei initialization process comprises acts of
obtaining a sub-image from the cytological image;
identifying a contour with edge detection in the sub-image;

extracting prominent ellipses with identified contour from each of sub-images using an ellipse Hough transform; and re-inspecting the nuclei candidates based on the center of the prominent ellipses.

11. The method as claimed in claim 10, wherein the edge detection uses Sobel operator, Laplacian operator or both in $1^{st}$-order derivative and $2^{nd}$-order derivative respectively.

12. The method as claimed in claim 10, wherein the act of re-inspecting the nuclei candidates is to check the distance between the center of potential nuclei and the center of detected prominent ellipse, wherein If the distance between the center of potential nuclei and the center of detected prominent ellipse is smaller than the average radius of the nuclei, then re-inspect as a nucleus; and if not, the candidate nucleus is eliminated.

\* \* \* \* \*